Nov. 13, 1956  R. H. JORDAN  2,770,505

BEARING

Filed March 19, 1953

INVENTOR.
Richard H. Jordan
BY
Woodling and Krost, attys.

2,770,505

BEARING

Richard H. Jordan, Mansfield, Ohio

Application March 19, 1953, Serial No. 343,350

6 Claims. (Cl. 308—72)

The invention relates in general to bearings and more particularly to an economically constructed and assembled and self-aligning bearing.

An object of the invention is to provide an economical sleeve bearing which is self-aligning.

Another object of the invention is to provide a bearing body which is elastically held by spring fingers on a holder body so that the bearing body cannot be dislodged from the holder body in normal use but which may be quickly assembled or disassembled by twisting or tumbling the bearing body through an angle, such as ninety degrees.

Another object of the invention is to provide a bearing body which has a generally curved or spherical surface so that it may twist relative to a holding body to provide a self-aligning feature.

Another object of the invention is to provide a bearing body with flattened sides or otherwise providing thin dimension of the bearing body so that it may be inserted between two generally adjacent ears on a holder body and then twisted through an angle so that the ears frictionally and elastically grip curved surfaces on the bearing body to hold it in place.

Another object of the invention is to provide a bearing body which has a plurality of external curved surfaces to provide points of contact with elastically held fingers on a holder body and with the points of contact so disposed that there is at least one point of contact on both sides of any and all diametral planes passing through the center of the bearing body.

Another object of the invention is to provide spring fingers on a holder body to hold a bearing body and also a lubricant saturated washer to lubricate the bearing.

Still another object of the invention is to provide a holder body having four spring fingers to hold a bearing body which has five curved surfaces, four of which contacting the spring fingers and the fifth of which permitting twisting of the bearing body for assembly and disassembly of the bearing body relative to the holder body.

Other objects and a fuller understanding of this invention may be had by referring to the following description and claims, taken in conjunction with the accompanying drawing, in which:

Figure 1:
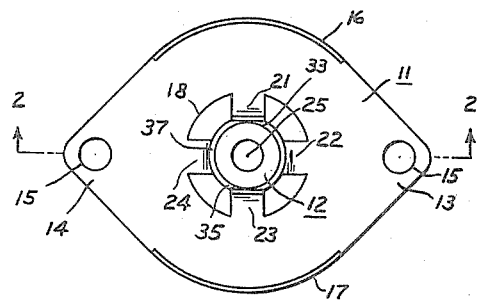
Figure 1 is a plan view of a combined bearing and holder.
Figure 2:
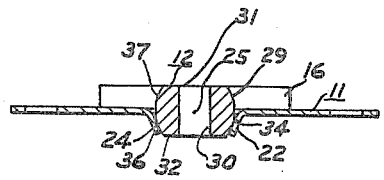
Figure 2 is a sectional view on the line 2—2 of Figure 1.

The Figures 1 and 2 show the preferred form of the invention which includes generally a holder body 11 and a bearing body 12. The holder body 11 is made of spring metal. The holder body 11 is generally circular and includes first and second mounting ears 13 and 14 with mounting holes 15 therein. Upturned flanges 16 and 17 are provided on the body 11 throughout approximately ninety degrees of arc for stiffening the body 11. The body 11 has an inner surface 18 defining a circular aperture. First, second, third, and fourth fingers 21, 22, 23, and 24 extend inwardly from the surface 18. These fingers are generally rectangular. Each finger 21 to 24 has a bend of approximately sixty degrees therein as best seen in Figure 2. Adjacent fingers are bent in opposite directions from the plane of the body 11 thus establishing opposite fingers 22 and 24 on the underside of the body and opposite fingers 21 and 23 on the upper side of the body. The inner surface of each of the fingers defines an area of contact with each of the areas of contact substantially equally spaced from a central point 25.

The bearing body 12 has a generally spherical outer surface 29. An inner surface 30 on the bearing body 12 defines a cylindrical journal. The bearing body 12 has equal and opposite planar faces 31 and 32. The axis of the journal 30 is generally normal to the faces 31 and 32. The central point 25 is the center of the spherical outer surface 29. The spring fingers 21, 22, 23, and 24 contact first, second, third, and fourth curved surface portions 33, 34, 35, and 36, respectively. A fifth curved surface portion 37 may be considered to be immediately above the fourth curved surface portion 36. The distance between the ends of the fingers 22 and 24 is slightly greater than the thickness of the bearing body 12 between the planar faces 31 and 32. This means that the bearing body 12 may be tumbled approximately ninety degrees in a counterclockwise direction as seen in Figure 2, and then the bearing body 12 will fall out between the fingers 22 and 24. In this tumbling movement the finger 24 will come in contact with the fifth curved surface portion 37; and hence, this curved surface portion 37 permits the tumbling of the bearing body 12. During this tumbling the finger 22 will slide off the second curved surface portion 34. Also during this tumbling the curved surface portions 33 and 35 will have little movement relative to the fingers 21 and 23, there merely being a slight twisting movement at these locations. It may thus be observed that one more curved surface portion than holder fingers will permit a tumbling of the bearing body relative to the holder body to effect assembly or disassembly. Assembly may be effected by reversal of the disassembly.

The spherical outer surface 29 permits a considerable amount of twisting and shifting of the bearing body 12 relative to the holder body 11 to establish a self-aligning bearing. The entire bearing assembly is very inexpensive to manufacture and assemble and may be quickly assembled during initial production and also may be quickly disassembled for repair or replacement. The fingers 21 to 24, since they are formed integrally with the body 11 which is of spring material, will have considerable elasticity to frictionally and elastically grip the bearing body 12.

The fingers 21 to 24 are symmetrically spaced with two fingers on each side of the plane of the holder body 11. This establishes that for any and all diametral planes passing through the central point 25, which is the center of the spherical surface 29, there will be at least one point of contact on each side of any such diametral plane. This establishes stability of the bearing body 12 relative to the holder body 11 to maintain the two in engagement.

Figure 3:
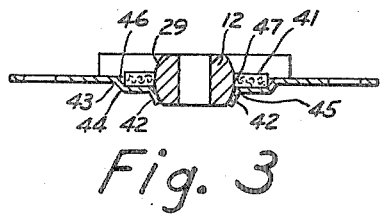
Figure 3 is a sectional view similar to Figure 2 but of a modification.

Figure 3 shows a modification of the invention wherein a lubricant saturated washer 41 is used. This washer may be an oil saturated felt washer or its equivalent. The fingers 42, which hold this washer 41, are changed from those shown in Figures 1 and 2. Each finger 42 has a sixty degree bend at 43, 44, and 45, successively in opposite directions. The first bend 43 creates a shoulder 46 against which the outer periphery of the washer 41 is disposed. The washer 41 is thus retained in a flat plane passing on opposite sides of adjacent fingers 42 to thus pass on the same side of opposite fingers. The washer 41 has an inner periphery 47 which preferably engages the spherical outer surface 29. The lubricant in the washer 41 thus is able to cover the entire surface of the bearing body 12 with a film of lubricant.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A bearing support and self-aligning bearing, comprising a body of spring sheet material, said body having a surface defining an aperture, four ears extending inwardly from said surface, adjacent ears being bent differently and opposite ears being bent similarly thereby establishing first and second opposite ears in a first plane and third and fourth opposite ears in a second plane, a generally spherical bearing having a given diameter and having two flattened faces, a surface defining a journal in said bearing and having an axis substantially normal to said flattened faces, said ears being spaced to frictionally grip said bearing, the spacing between the ends of all said ears on one side of said body being slightly greater than the thickness of said bearing between said flattened faces in one direction and greater than the said given diameter in a direction perpendicular to said one direction to permit assembly by passing said bearing flattened faces between the two opposite ears in one of said first and second planes with the bearing axis in a plane generally parallel to said body and then tumbling said bearing ninety degrees into a position so that said bearing axis is generally normal to the plane of said body wherein each ear frictionally grips said bearing at substantially equidistant points from the nearest flattened face.

2. A bearing support and self-aligning bearing, comprising a flat body of spring sheet metal, said body having two diametrically extending mounting ears thereon, a surface defining an aperture in said body, four generally rectangular ears extending generally radially inwardly from said surface, adjacent ears being bent in opposite directions approximately sixty degrees from the plane of said body thereby establishing opposite ears on the same side of said body, a generally spherical bearing having a given diameter and having two substantially equal and opposite parallel planar faces, an internal surface defining a journal in said bearing and having an axis substantially normal to said planar faces, said ears being spaced to frictionally grip said bearing, the spacing between the ends of all said ears on one side of said body being slightly greater than the thickness of said bearing between said planar faces in one direction and greater than the said given diameter in a direction perpendicular to said one direction to permit assembly by passing said bearing planar faces between the two ears on one side of said body with the bearing axis in a plane parallel to said body and then tumbling said bearing ninety degrees into a position so that said bearing axis is generally normal to the plane of said body wherein each ear frictionally grips said bearing at substantially equidistant points from the nearest planar face.

3. A bearing support and self-aligning bearing, comprising a flat body of spring sheet metal, said body being generally circular with two diametrically extending mounting ears thereon, upturned curved stiffening flanges on the two circular sides of said body between said mounting ears, a surface defining a generally circular aperture in said body, only four generally rectangular ears extending generally radially inwardly from said surface and integral with said body, adjacent ears being bent in opposite directions approximately sixty degrees from the plane of said body thereby establishing only two opposite ears on each of the two sides of said body, a generally spherical bearing having two substantially equal and opposite parallel planar faces, a surface defining a cylindrical journal in said bearing and having an axis substantially normal to said planar faces, said ears being spaced to frictionally grip said bearing, the ends of said ears being spaced apart a distance slightly greater than the thickness of said bearing between said planar faces to permit assembly by passing said bearing planar faces between the two ears on either side of said body with the bearing axis in a plane parallel to said body and then tumbling said bearing ninety degrees into a position so that said bearing axis is generally normal to the plane of said body wherein each ear frictionally grips said bearing at substantially equidistant points from the nearest planar face.

4. A bearing support and self-aligning bearing, comprising a flat body of spring sheet metal, said body being generally circular with two diametrically extending mounting ears thereon, upturned curved stiffening flanges on the two circular sides of said body between said mounting ears, a surface defining a generally circular aperture in said body, only four generally rectangular ears extending generally radially inwardly from said surface and integral with said body, adjacent ears being bent in opposite directions approximately sixty degrees from the plane of said body thereby establishing opposite ears on the same side of said body, each ear having only one bend therein, a generally spherical bearing having two substantially equal and opposite parallel planar faces, a surface defining a cylindrical journal in said bearing and having an axis substantially normal to said planar faces, said ears being spaced to frictionally grip said bearing, the ends of said ears being spaced apart a distance slightly greater than the thickness of said bearing between said planar faces to permit assembly by passing said bearing planar faces between the two ears on one side of said body with the bearing axis in a plane parallel to said body and then tumbling said bearing ninety degrees into a position so that said bearing axis is generally normal to the plane of said body wherein each ear frictionally grips said bearing at substantially equidistant points from the nearest planar face.

5. A bearing support and self-aligning bearing, comprising a flat body of spring sheet metal, said body being generally circular with two diametrically extending mounting ears thereon, upturned curved stiffening flanges on the two circular sides of said body between said mounting ears, a surface defining a generally circular aperture in said body, only four generally rectangular ears extending generally radially inwardly from said surface and integral with said body, adjacent ears being bent in opposite directions from the plane of said body thereby establishing opposite ears on the same side of said body, each said ear having first, second, and third bends of approximately sixty degrees each and successively in different directions to establish first and second shoulders in each ear, a lubricant saturable washer having an outer peripheral surface engaging said first shoulders and having an inner peripheral surface, a generally spherical bearing having two substantially equal and opposite parallel planar faces, a surface defining a cylindrical journal in said bearing and having an axis substantially normal to said planar faces, said second shoulders of said ears being spaced to frictionally grip said bearing, said inner peripheral surface of said lubricant saturable washer lying closely adjacent the spherical surface of said bearing, the ends of said ears being spaced apart a distance slightly greater than the thickness of said bearing between said planar faces to permit assembly by passing said bearing planar faces between the two ears on one side of said body with the bearing axis in a plane parallel to said body and then tumbling said bearing ninety degrees into a position so that said bearing axis is generally normal to the plane of said body wherein each ear frictionally grips said bearing at substantially equidistant points from the nearest planar face.

6. A bearing support and generally spherical bearing, comprising a body of spring sheet metal, said body having a surface defining an aperture, only four ears extending inwardly from said surface, said ears being spaced substantially ninety degrees apart, opposite ears being bent similarly and adjacent ears being bent differently to form a first and a second pair of opposite ears, the generally spherical bearing having first and second contiguous curved peripheries and having first and second flattened faces, said flattened faces being substantially parallel, said bearing having a first and a second axis substantially perpendicular to each other and lying substantially parallel to said body of spring sheet metal when said bearing is in an assembled position, a surface defining a journal in said bearing and having an axis substantially normal to said flattened faces when said bearing is in an assembled position, said first pair of ears being spaced to frictionally grip said bearing on said first periphery, said second pair of ears being spaced to frictionally grip said bearing on said second periphery, the distance between said first and second flattened faces being less than the normal diameter of said spherical bearing, the distance between ends of all ears on each side of said body being greater than the distance between said flattened faces and less than the normal diameter of said spherical bearing, means engaging the first periphery of said bearing including said first pair of ears for retaining said bearing from movement in a first direction normal to the surface of said spring sheet metal when said bearing is in said assembled position and permitting unobstructed movement of said bearing in said normal direction upon rotation of said bearing through substantially a right angle about said first axis, means engaging the second periphery of said bearing comprising said second pair of ears for retaining said bearing from movement in a second direction normal to the surface of said spring sheet metal when said bearing is in said assembled position and permitting unobstructed movement of said bearing in said normal direction upon rotation of said bearing through substantially a right angle about said second axis.

References Cited in the file of this patent

UNITED STATES PATENTS

| | | |
|---|---|---|
| 1,352,204 | Leitch | Sept. 7, 1920 |
| 1,924,072 | Lavigne | Aug. 22, 1933 |
| 2,083,688 | Clements | June 15, 1937 |
| 2,345,564 | Allen | Apr. 4, 1944 |
| 2,423,684 | Collito | July 8, 1947 |
| 2,621,088 | Cole | Dec. 9, 1952 |